June 3, 1969  E. SARONNI  3,447,748

THERMOSTATIC APPARATUS

Filed May 18, 1967

INVENTOR.
Emiliana Saronni
BY
Agent

# United States Patent Office 3,447,748
Patented June 3, 1969

3,447,748
THERMOSTATIC APPARATUS
Emiliana Saronni, Viale Tibaldi 10, Milan, Italy
Filed May 18, 1967, Ser. No. 639,373
Claims priority, application Italy, May 20, 1966,
18,127/66
Int. Cl. F16t *1/08, 1/12*
U.S. Cl. 236—59          4 Claims

ABSTRACT OF THE DISCLOSURE

This invention relates to a thermostatic control unit which comprises a hollow casing defining a fluid chamber and having a fluid inlet and a fluid outlet, a valve seat provided in said hollow casing and communicating between said fluid chamber and said fluid outlet, an axially slidable valve member arranged in said valve seat for controlling the flow of fluid from said fluid chamber to said fluid outlet, and a bi-metallic plate having one end in abutting engagement with a flange provided on the shaft of said valve, the other end of said bi-metallic plate being secured to said casing, said bi-metallic plate being arranged to cause the axial sliding of said valve in response to variations in the pressure: temperature ratio in said fluid chamber.

---

Figure 1:
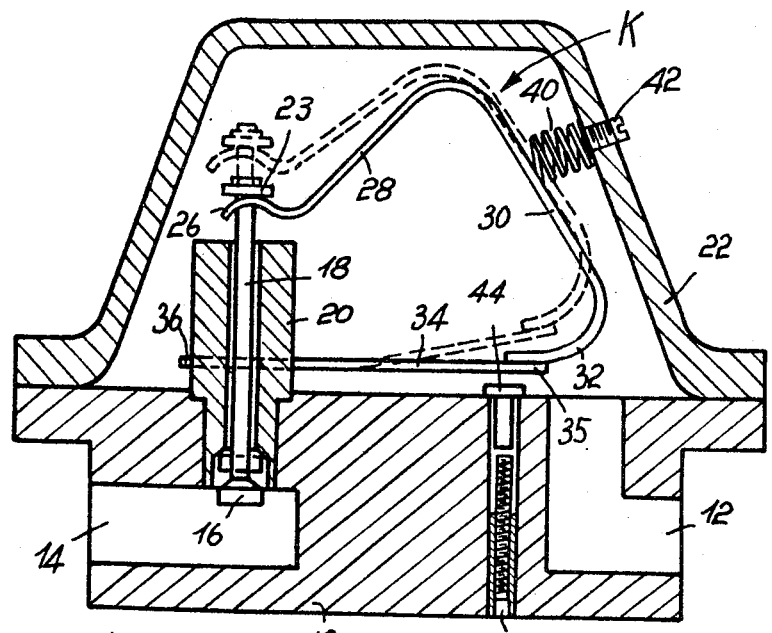

This invention relates to a thermostatic control unit and more particularly a thermostatic control unit for steam traps.

In known thermostatically controlled steam traps the discharge of the condensate is usually controlled by a bi-metallic plate which is arranged to actuate a control valve of the steam trap in response to changes of temperature. However, in known thermostatically controlled steam traps the control valve member generally does not slide axially within its seat in response to deformation or expansion of the bi-metallic plate. If the valve member does not slide axially, friction and wear occur between the valve and the valve seat and the efficiency of the valve is considerably impaired. In order to avoid such difficulties it has heretofore been necessary to provide particular arrangements to ensure the axial sliding of the valve member. It is also known in the field of thermostatically controlled steam traps to correct the expansion curve of the bi-metallic plate (which curve has a linear behaviour) so that it substantially corresponds to the characteristic pressure: temperature curve of the steam. Heretofore this correspondence between the expansion curve of the bi-metallic plate and the steam pressure: temperature curve has been obtained by means of complicated solutions which do not satisfy the normal working conditions of steam traps.

It is the object of the invention to obviate said drawbacks and to provide for an exact modification of the displacements of the bi-metal plate so as to make them conveniently responsive to the temperature of the steam.

Another object of this invention is to provide a thermostatic apparatus which is of simple manufacture and which is reliable in its working.

It is a further object of this invention to provide an apparatus which is capable of transmitting control movements which are developing according to a linear path to the involved valve means.

These and other objects, which will be more apparent from the detailed description which follows, are reached by an apparatus of the class having in combination a hollow body, an inlet and outlet in said hollow body, a bi-metal member in said hollow body, a valve seat at said outlet, a valve element in said valve seat, which element is engaged with said bi-metal member and reacts in response to the deformations of said bi-metal member and comprises at least a bi-metal compensation plate arranged for engagement with said bi-metal member and made to be responsive to the steam pressure.

In an advantageous embodiment of the invention, the apparatus comprises a U-shaped bi-metal member, a bi-metal plate which is arranged so as to extend in the direction of one arm of said bi-metal member, the metal having a minor thermic dilatation coefficient of said bi-metal member facing and being in engagement with the face of the metal having a minor thermic dilatation coefficient of said bi-metal plate, so that the deformation of said member and said plate occur in the same direction.

Figure 2:
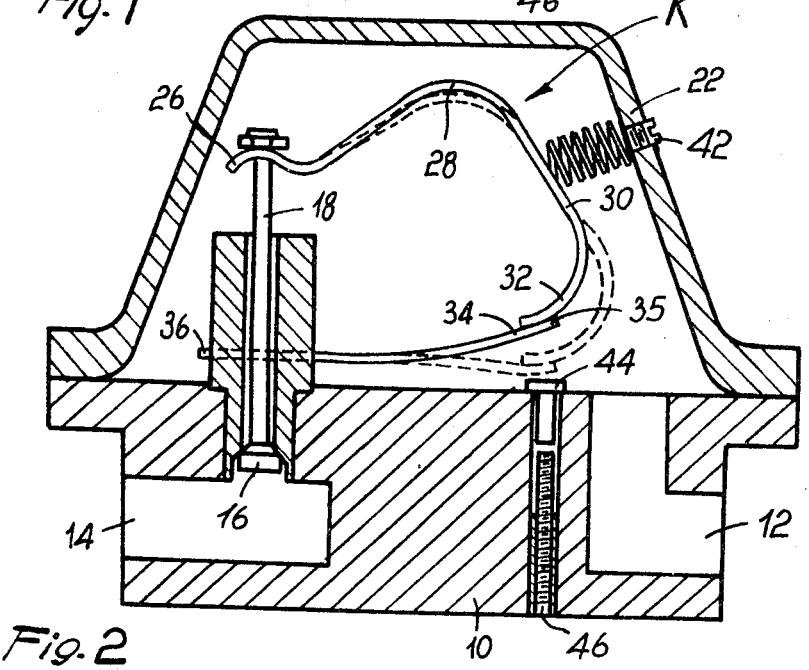

Further features and advantages of the invention will better appear from the description of a preferred embodiment, which is shown by way of example only in the accompanying drawing, in which:

FIGURES 1 and 2 diagrammatically show a vertical cross section of a steam trap comprising the apparatus according to the invention, in two different operative positions.

Referring now more particularly to the drawing, the steam trap is formed of a body 10, which is provided with an inlet connection 12 and an outlet connection 14. The communication between these connections is controlled by a control valve 16, having a shaft 18 which is slidingly guided within a seat 20, which is secured to the body 10. Said seat is situated within a cap 22, which, together with body 10, delimits a steam trap chamber which finds its inlet in 12 and its outlet in 14.

The shaft 18 ends in the range of its end portion facing said cap 22 with a rim 23, engaged by a shaped end 26 of a bi-metal member K formed of a U-shaped element 28. The middle part 30 of this element has a portion having a linear shape, with an end thereof bent towards the shaft 18.

The other end 32 of element 28 is in metal connection with one of the ends 35 of a bi-metal plate 34, forming said compensation plate, the other end 36 of which is conveniently secured, for instance to the seat 20. The connection between the ends 32 and 35 is effected so that the faces of the metals having a minor thermic deformation coefficient are in intimate contact between each other and are tightly engaged between themselves.

Within the range of the linear portion 30 of the bi-metal element 28, one end of a spring 40 is made to bear, which spring is made for example by a helical member, the other end of which is in engagement with a set screw 42 housed within the cap 22.

A stop member, provided with a set screw 46, is made to extend through the body 10 and is arranged within the range of junction 32–35 of the two bi-metal elements 28 and 34, to limit the deformation of the compensation plate 34 forming one of said elements.

As a consequence of the arrangement of the bi-metal elements and of the adjustment to which the bi-metal K is subjected, when the steam trap is in its inoperative condition, the control valve 16 is open, as shown in FIG. 1. Thus the communication between the inlet 12 and outlet 14 is established so that the condensate which is present in the steam is conveniently discharged. When the equipment, where the steam trap is mounted, reaches its operative condition, the thermic action of the steam deforms the bi-metal member K which takes on the position of FIG. 2, where the control valve 16 closes the communication between the inlet 12 and outlet 14. In case in which the steam includes condensate particles, these particles bring about hte reduction of the temperature within the cap 22 according to the characteristic steam temperature-pressure curve, which causes the bi-metal U-shaped member to effect a linear deformation. This deformation is modified by the deformation of the compensation plate 34, which bends the linear course of the curve of said element 28 so as to have it extended in a direction which is essentially coincident and/or parallel to the temperature-pressure curve. As a consequence thereof a valve 16 is opened to discharge the condensate particles and these operations are repeated whenever the steam modifies its temperature with respect to its humidity content.

The spring 40, which bears on the straight portion 30 of the bi-metallic element 28, acts as an elastic fulcrum and exerts on said bi-metallic element a push which tends to keep in a practically unvaried condition the point of engagement between the ends 26 and shaft 18, independently from the deformation the bi-metallic element K has been subjected to.

The compensating plate 34 may have a different shape and be formed of a bi-metal, whose deformation coefficient is different from that of the element 28.

Although a preferred embodiment has been heretofore described and shown in the drawing, it is obvious that many modifications may be made within the scope of the inventive concpet and therefore the right is reserved to all such alternative embodiments which come within the aforesaid scpoe.

I claim:

1. A thermostatic control unit comprising a hollow casing defining a fluid chamber, a fluid inlet and a fluid outlet in said hollow casing, a valve seat in said hollow casing and communicating between said fluid chamber and said fluid outlet, an axially slidable valve in said valve seat for controlling the flow of fluid from said fluid chamber to said fluid outlet, a valve shaft connected to said valve, a bi-metallic plate arranged inside said fluid chamber, one end of said bi-metallic plate being operatively connected to said valve seat, the other end of said bi-metallic plate being secured to said valve shaft, said bi-metallic plate being arranged to cause axial sliding of said valve in order to open and close said communication between said fluid chamber and said fluid outlet, in response to variations in the temperature: pressure ratio in said fluid chamber.

2. A thermostatic control unit as claimed in claim 1, wherein said bi-metallic plate includes one end portion rigid with said valve shaft, a substantially straight portion and an end portion opposite said one end portion secured to said valve seat.

3. A thermostatic control unit as claimed in claim 2, further comprising spring means in said hollow casing arranged to adjustably react against said intermediate portion of said bi-metallic plate.

4. A thermostatic control unit as claimed in claim 3 comprising a set-screw member in said hollow body, located so as to come into engagement with said spring means and adjust their actions on said bi-metallic plate.

References Cited

UNITED STATES PATENTS

| | | | |
|---|---|---|---|
| 80,436 | 7/1868 | Wilson | 236—59 |
| 1,395,167 | 10/1921 | Trane | 236—59 |
| 1,412,465 | 4/1922 | Ferris | 236—59 |
| 1,455,021 | 5/1923 | Collin | 236—59 |

WILLIAM J. WYE, Primary Examiner.

U.S. Cl. X.R.

236—66